United States Patent
Bilancia et al.

(10) Patent No.: US 10,247,082 B2
(45) Date of Patent: Apr. 2, 2019

(54) HEAT MANAGEMENT SYSTEM FOR AN AUTOMOTIVE SYSTEM

(71) Applicant: GM GLOBAL TECHNOLOGY OPERATIONS LLC, Detroit, MI (US)

(72) Inventors: Michele Bilancia, Turin (IT); Akram R. Zahdeh, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 104 days.

(21) Appl. No.: 15/373,292

(22) Filed: Dec. 8, 2016

(65) Prior Publication Data

US 2017/0159542 A1 Jun. 8, 2017

(30) Foreign Application Priority Data

Dec. 8, 2015 (GB) .................................. 1521620.3

(51) Int. Cl.
*F01N 3/00* (2006.01)
*F01P 3/20* (2006.01)
*F02M 26/29* (2016.01)
*F01M 5/00* (2006.01)
*F01N 3/023* (2006.01)
(Continued)

(52) U.S. Cl.
CPC .............. *F01P 3/20* (2013.01); *F01M 5/002* (2013.01); *F01M 5/021* (2013.01); *F01N 3/021* (2013.01); *F01N 3/0234* (2013.01); *F01N 3/103* (2013.01); *F01N 3/2006* (2013.01); *F01N 13/10* (2013.01); *F01P 3/22* (2013.01); *F02M 26/29* (2016.02); *F01N 2240/02* (2013.01); *F01P 2003/2278* (2013.01); *F01P 2037/00* (2013.01); *F01P 2060/04* (2013.01); *F01P 2060/16* (2013.01); *F02M 26/14* (2016.02); *Y02T 10/26* (2013.01)

(58) Field of Classification Search
CPC ...... F01M 5/002; F01M 5/021; F01N 3/0234; F01N 3/2006; F01P 2037/00; F01P 3/20; F02M 26/29
See application file for complete search history.

(56) References Cited

U.S. PATENT DOCUMENTS 6,427,640 B1 * 8/2002 Hickey .................. F01M 5/007
123/41.31
8,281,884 B2 10/2012 Cimatti et al.
(Continued)

FOREIGN PATENT DOCUMENTS

CN 103334820 A 10/2013
CN 203362285 U * 12/2013
FR 2910388 A3 6/2008

OTHER PUBLICATIONS

CN 203362285 English Machine Translation.*
Great Britain Patent Office, Great Britain Search Report for Great Britain Application No. 1521620.3, dated Jun. 8, 2016.

*Primary Examiner* — Audrey K Bradley
*Assistant Examiner* — Anthony Ayala Delgado
(74) *Attorney, Agent, or Firm* — Lorenz & Kopf, LLP

(57) ABSTRACT

A heat management system is provided for an automotive system having a plurality of heat manageable components. The heat management system includes a plurality of heat transferring path having a plurality of heat pipes, and a heat exchanger for each of the heat manageable component of the automotive system. The heat pipes are configured to transfer heat from at least one of the heat exchanger to another heat exchanger.

17 Claims, 3 Drawing Sheets

(51) Int. Cl.
*F01N 3/20* (2006.01)
*F01N 13/10* (2010.01)
*F01M 5/02* (2006.01)
*F01N 3/10* (2006.01)
*F01N 3/021* (2006.01)
*F01P 3/22* (2006.01)
*F02M 26/14* (2016.01)

(56) References Cited

U.S. PATENT DOCUMENTS

| | | | |
|---|---|---|---|
| 8,720,185 B2* | 5/2014 | Webb | F01N 3/02 180/309 |
| 2008/0141664 A1 | 6/2008 | Bidner et al. | |
| 2011/0131962 A1 | 6/2011 | Toi et al. | |
| 2013/0130074 A1 | 5/2013 | Timmons et al. | |

\* cited by examiner

HEAT MANAGEMENT SYSTEM FOR AN AUTOMOTIVE SYSTEM

CROSS-REFERENCE TO RELATED APPLICATION

This application claims priority to Great Britain Patent Application No. 1521620.3, filed Dec. 8, 2015, which is incorporated herein by reference in its entirety.

TECHNICAL FIELD

The present disclosure pertains to a heat management system for an automotive system.

BACKGROUND

Typically, internal combustion engines are fluid cooled using a liquid coolant flowing through a heat exchanger, such as a radiator, cooled by air. Liquid cooled engines usually have a circulation pump.

Modern internal combustion engines may also be provided with separate circuits for the cylinder head and cylinder block of the engine, enabling faster warm-up of the engine. The respective cooling circuits are designed using controllable coolant pumps, for example a main water pump and an auxiliary water pump that are provided with controllable valves that manage the coolant flow rate between different heat exchangers.

During warm-up of the engine, the main water pump may be inactive until exhaust gas recirculation or EGR of cylinder head cooling is required, while the auxiliary water pump may be running only during start/stop operations and as a function of heating demands.

These cooling systems need a complex piping architecture to allow coolant delivery in the desired areas.

Accordingly, there is a need to create a high-efficiency heat exchanger system to recover heat coming from fuel combustion and from exhaust gas of the automotive system.

SUMMARY

An embodiment of the present disclosure provides a heat management system for an automotive system. The automotive system is provided with a plurality of heat manageable components. The heat management system includes a plurality of heat transferring paths. The heat transferring paths include a plurality of heat pipes. The heat management system also includes a heat exchanger for each of the heat manageable component of the automotive system. The heat pipes are configured to transfer heat from at least one of the heat exchanger to another heat exchanger. An advantage of this embodiment is that it allows an effective management of energy flows in the automotive system, leading to a higher efficiency engine, in terms of lower fuel consumption and faster warm-up phase.

Heat manageable components of the automotive system, may be a cylinder head, a cylinder block, an integrated exhaust manifold (IEM), an exhaust line, engine oil, transmission oil, a short route EGR (SR-EGR) and, if present a long route EGR (LR-EGR), along with external heat sink, external heat reservoirs and the like. In the following description, the term heat exchanger will assume a very general meaning considering that, according to the circumstances, the automotive heat manageable component to which it is associated, may assume the role of a heat source or of a heat sink.

Also by installing heat exchangers having high heat exchange coefficients nearer to the interested areas, thermal dispersion in engine metal portions that are not directly interested is avoided or greatly minimized. This feature increases the percentage of thermal energy transferred into available power, hence, increasing the engine efficiency.

According to an embodiment of the present disclosure, the heat pipes are connected to a common manifold. An advantage of this embodiment is that it optimizes the layout of the heat transferring paths saving space inside the engine's compartment.

According to another embodiment of the present disclosure, the heat management system further includes at least one valve to selectively transfer heat from at least one of the heat exchanger to another heat exchanger. An advantage of this embodiment is that it allows to selectively transfer heat from a heat exchanger to another heat exchanger, for example under control of an electronic control unit of the automotive system.

According to an embodiment of the present disclosure, the heat transferring paths include an engine oil heat exchanger pipe connected to an engine oil heat exchanger and intercepted by an engine oil heat exchanger valve. An advantage of this embodiment is that heat can be transferred easily to the oil in the oil sump in order to accelerate engine warm up and reduce friction.

According to another embodiment of the present disclosure, the heat transferring paths include a transmission oil heat exchanger pipe connected to a transmission oil heat exchanger and intercepted by a transmission oil heat exchanger valve. An advantage of this embodiment is that it improves speed of heating and cooling of transmission oil.

According to still another embodiment of the present disclosure, the heat transferring paths include an EGR heat exchanger pipe connected to an EGR heat exchanger and intercepted by an EGR heat exchanger valve. An advantage of this embodiment is that heat can be transferred from the EGR to provide EGR cooling.

According to a further embodiment of the present disclosure, the heat transferring paths include an external heat exchanger pipe connected to an external heat exchanger and intercepted by an external heat exchanger valve. An advantage of this embodiment is that, by opening the external heat exchanger valve, heat can be transferred from the engine to an external heat exchanger, namely a radiator, avoiding overheating of the engine.

According to a further embodiment of the present disclosure the heat transferring paths include an external heat reservoir pipe connected to an external heat reservoir and intercepted by an external heat reservoir valve. An advantage of this embodiment is that, by opening the external heat reservoir valve, heat in excess from the engine can be transferred to a heat storage reservoir.

According to still another embodiment of the present disclosure, the heat transferring paths include a Diesel Particulate Filter (DPF) heat exchanger pipe connected to a DPF heat exchanger and intercepted by a DPF heat exchanger valve. An advantage of this embodiment is that, in case a quick warm up of the engine is desired, heat can be recovered from the exhaust line which warms first, in particular from the DPF, and conveyed to the engine.

According to a further embodiment of the present disclosure, the heat transferring paths include a Diesel Oxidation Catalyst (DOC) heat exchanger pipe connected to a DOC heat exchanger and intercepted by a DOC heat exchanger valve. An advantage of this embodiment is that, in case a quick warm up of the engine is desired, heat can be recovered from the exhaust line which warms first, in particular from the DOC, and conveyed to the engine.

According to still another embodiment of the present disclosure, the heat transferring paths include an integrated exhaust manifold (IEM) heat exchanger pipe connected to an IEM heat exchanger and intercepted by an IEM heat exchanger valve. An advantage of this embodiment is that heat from the IEM can be conveyed back to oil to speed up warm up of the engine According to a further embodiment of the present disclosure, the heat transferring paths include a cylinder block heat exchanger pipe connected to a cylinder block heat exchanger and intercepted by a cylinder block heat exchanger valve. An advantage of this embodiment is that, by opening the cylinder block heat exchanger valve, excess heat from the engine can be transferred to oil.

According to another embodiment of the present disclosure, the heat transferring paths include a cylinder head heat exchanger pipe connected to a cylinder head heat exchanger and intercepted by a cylinder head heat exchanger valve. An advantage of this embodiment is that, by opening the cylinder head heat exchanger valve, excess heat from the engine can be transferred to oil.

According to another embodiment of the present disclosure, an electrical pump connects the common manifold with the cylinder block heat exchanger pipe. An advantage of this embodiment is that the electrical pump can assist the heat management system in case of peak power operations.

Another embodiment of the present disclosure provides for an automotive system including a heat management system, the automotive system being controlled by an electronic control unit or ECU. The ECU is configured to act upon valves provided in the heat management system. An advantage of this embodiment is that it allows to selectively transfer heat from a heat exchanger to another heat exchanger.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
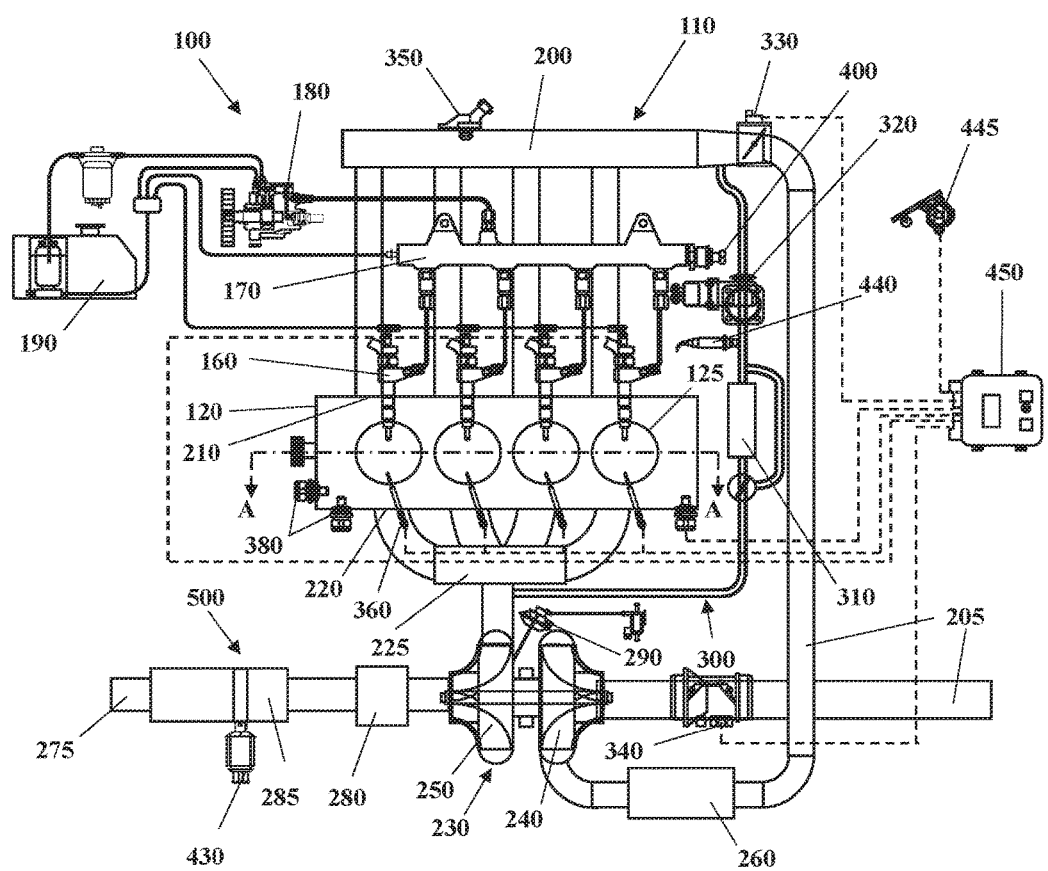
FIG. 1 shows an automotive system.
Figure 2:
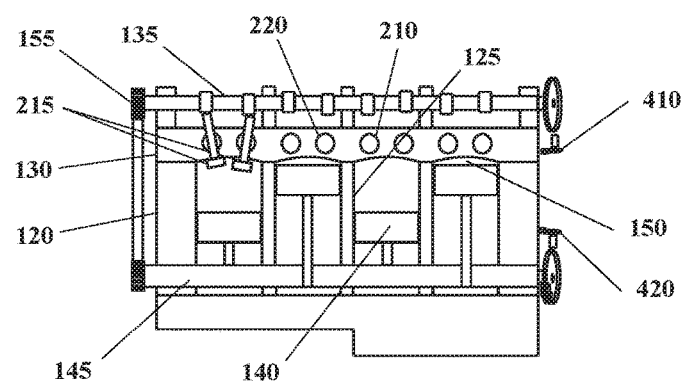
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145.

A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increases the pressure of the fuel received from a fuel source 190.

In FIG. 2 it is also shown that each of the cylinders 125 has at least an intake valve 215 and an exhaust valve 217, both actuated by a camshaft 135 rotating in time with the crankshaft 145. The intake valves 215 selectively allow air into the combustion chamber 150 from the port 210 and the exhaust valves 217 alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. A charge air cooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move a rack of vanes 295 in different positions, namely from a fully closed position to a fully open position, to alter the flow of the exhaust gases through the turbine 250. In other embodiments, the turbocharger 230 may be fixed geometry and/or include a waste gate.

The exhaust gases of the engine are directed into an exhaust system 270. The exhaust system 270 may include an exhaust pipe 275 having one or more exhaust aftertreatment devices. The aftertreatment devices may be any device configured to change the composition of the exhaust gases. Some examples of aftertreatment devices include, but are not limited to, catalytic converters (two and three way), oxidation catalysts, lean $NO_x$ traps, hydrocarbon adsorbers, selective catalytic reduction (SCR) systems, and particulate filters.

Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

Still other embodiments may include a second EGR conduit defining a long route (or low pressure route) for the exhaust gas recirculation, which includes also the portion of the exhaust line included between the exhaust manifold and a branching point thereof, and a portion of the intake line included between a leading point of the Long Route into the intake manifold.

The automotive system 100 may further include an electronic control unit (ECU) 450 in communication with one or more sensors and/or devices associated with the ICE 110 and with a memory system and an interface bus. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor that may be integral within glow plugs 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal 447 position sensor 445. Furthermore, the ECU 450 may generate output signals to various control devices that are arranged to control the operation of the ICE 110, including, but not limited to, the fuel injectors 160, the throttle body 330, the EGR Valve 320, a Variable Geometry Turbine (VGT) actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Figure 3:
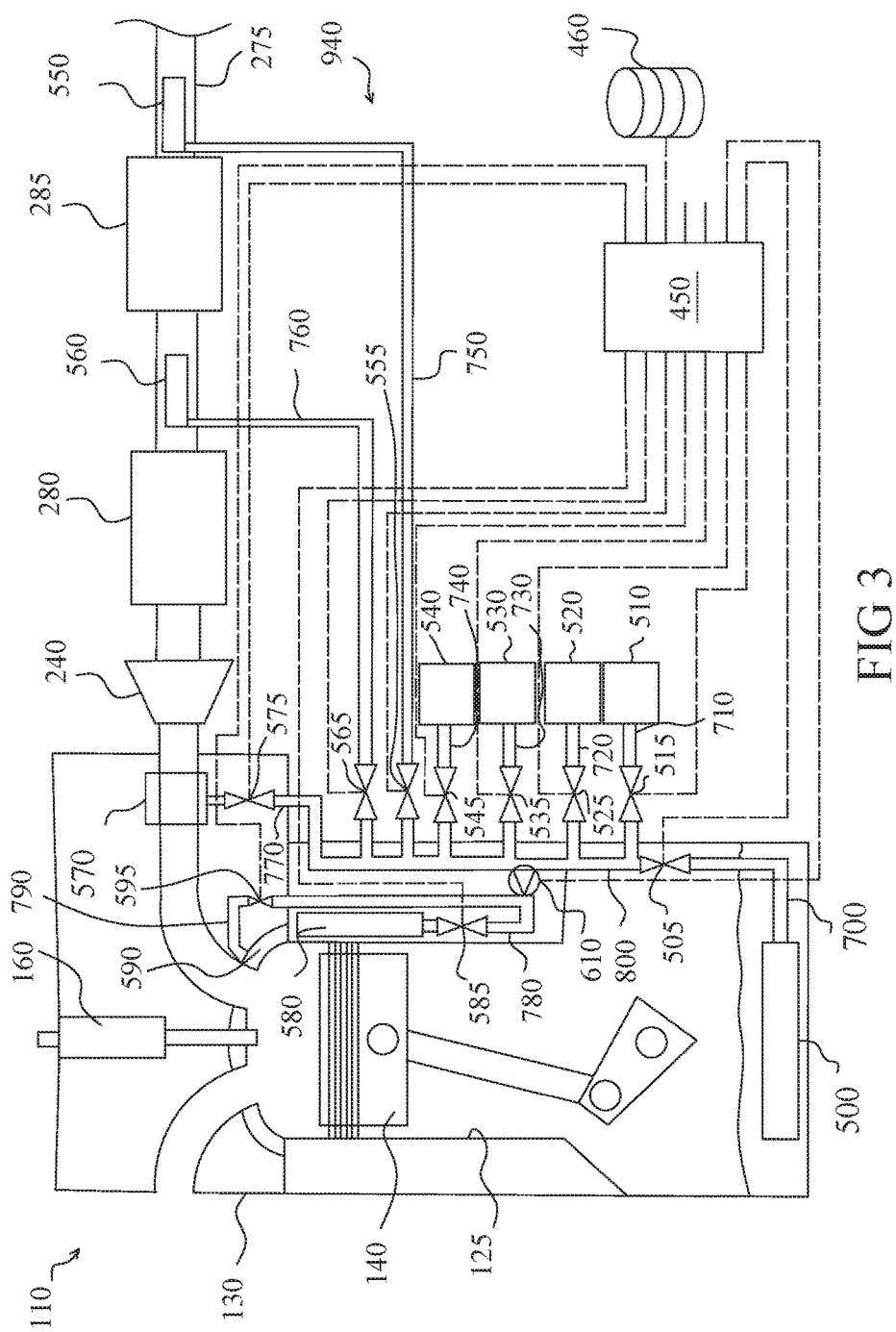
FIG. 3 shows a portion of the automotive system of FIG. 1 illustrating an engine thermal management system according to an embodiment of the present disclosure.

Instead of an ECU 450, the automotive system 100 may have a different type of processor to provide the electronic logic, e.g. an embedded controller, an onboard computer, or any processing module that might be deployed in the vehicle FIG. 3 shows an engine thermal management system according to an embodiment of the present disclosure.

The thermal management system of FIG. 3 is based on heat pipe technology. The heat pipe technology will be better described hereinafter with particular reference to FIG. 4.

In the engine thermal management system of FIG. 3, several heat exchangers are installed in the automotive system 100, in such a way to reach all the available heat sources, or in other words, heat manageable components of the automotive system 100, such as cylinder head, a cylinder block, Integrated Exhaust Manifold (IEM), exhaust line, engine oil, transmission oil, Short Route EGR and Long Route EGR (if present), external heat sink, external heat reservoirs and so on. All of these heat exchangers are connected to the respective heat source or heat sink via heat pipes.

In the following description the term heat exchanger will assume a very general meaning considering that, according to the circumstances, the automotive heat manageable component to which it is associated, may assume the role of a heat source or of a heat sink. For example, a heat exchanger can be a fluid radiator or could also be a conductive plate made of heat conductive material thermally connected to a cylinder block or a cylinder head or to any other thermally active surface.

The entire heat management system 940 of FIG. 3 is managed by a series of valves connected to the ECU 450 and the ECU 450 is programmed to convey the various heat flows in a convenient way to assure high engine efficiency and fast warm-up. However, some configurations of the heat management system 940 may provide for heat pipes that are not equipped with valves. In the system of FIG. 3, a small displacement coolant pump 610 is used to force coolant flow in liquid phase to the cylinder head 130 and to the cylinder block heat exchanger, in case of peak power requests.

Figure 4:
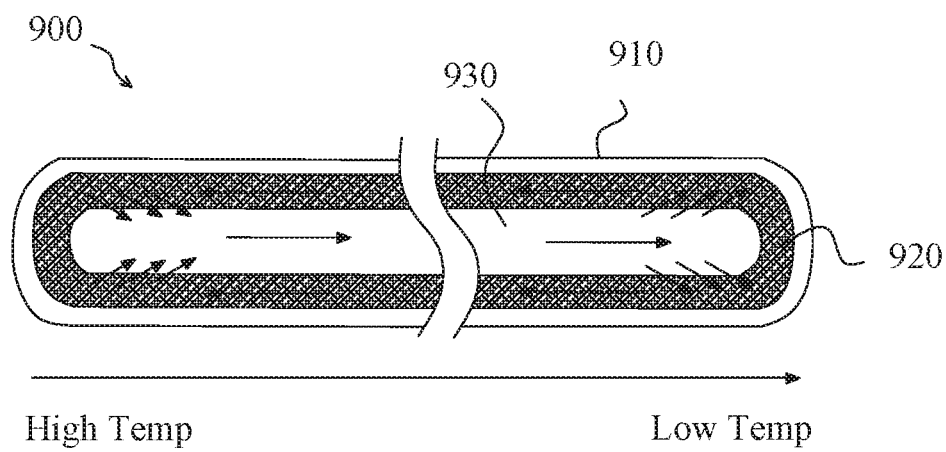
FIG. 4 shows a generic heat pipe.

FIG. 4 shows a generic heat pipe 900, for purposes of illustration. Heat pipe 900 is a heat-transfer device that combines the physical principles of thermal conductivity and phase transition to efficiently manage transfer of heat. A typical heat pipe 900 may be provided with a sealed pipe or tube having a casing 910 made of a material such as copper or aluminum or other metallic material.

Internally to the metal casing 910, a vapor cavity 930 is provided, and the vapor cavity 930 is separated from the metal casing 910 by a wick structure 920. The wick structure 920 is suitable to exert a capillary action on the liquid phase of a working fluid circulating inside the heat pipe 900. Wick structures 920 used in heat pipes may include sintered metal powder, screen, and grooved wicks, which have a plurality of grooves parallel to the pipe axis.

The heat pipe 900 is partially filled with the working fluid and then sealed. The working fluid mass is chosen so that the heat pipe contains both vapor and liquid over the operating temperature range. The working fluid may be water, ethanol, or antifreeze liquid or other suitable liquids.

In operation, when subjected to a high temperature such as in the left portion of FIG. 4, the working fluid evaporates to vapor absorbing thermal energy. The vapor migrates along the vapor cavity 930 to a lower temperature end of the heat pipe 900 (right portion of FIG. 4). Vapor condenses back to fluid and is absorbed by the wick structure 920 releasing thermal energy and, finally, the working fluid flows back to the higher temperature end.

Turning back to FIG. 3, in the engine thermal management system 940, a plurality of heat transferring paths including several pipes is represented. All the pipes of the heat management system 940 may be configured as heat pipes. Preferably, the pipes of the heat management system 940 stem from a common manifold 800.

Nevertheless, the layout described in FIG. 3, including the common manifold 800 is simply an exemplary configuration of the heat management system 940. Other configurations are possible for the heat management system 940, even configurations that do not provide for a common manifold, provided that a manageable heat pipe connection system between the heat exchangers is provided, regardless of the specific layout of the heat exchangers and of the specific layout of the connection heat pipes.

In the heat management system 940, the heat transferring paths include an engine oil heat exchanger pipe 700 connected to an engine oil heat exchanger 500 and intercepted by an engine oil heat exchanger valve 505.

Furthermore, from the common manifold 800, a transmission oil heat exchanger pipet 710 is derived, connecting a transmission oil heat exchanger 510 by interposition of a transmission oil heat exchanger valve 515.

Also, in the heat management system 940, the heat transferring paths include an EGR heat exchanger pipe 720 connected to an EGR heat exchanger 520 and intercepted by an EGR heat exchanger valve 525.

If a long route EGR is present, the heat management system 940 may also provide for a Long Route EGR heat exchanger pipe connecting the common manifold 800 to a Long Route EGR heat exchanger by interposition of a respective valve.

In the heat management system 940, the heat transferring paths further include an external heat exchanger pipe 730 connected to an external heat exchanger 530 and intercepted by an external heat exchanger valve 535.

In a similar fashion, the heat transferring paths further include an external heat reservoir pipe 740 connected to an external heat reservoir 540 and intercepted by an external heat reservoir valve 535.

In the heat management system 940, the heat transferring paths include a Diesel Particulate Filter (DPF) heat exchanger pipe 750 connected to a DPF heat exchanger 550 and intercepted by a DPF heat exchanger valve 555.

In some embodiments, the DPF 285 may be substituted by a SCRF (Selective Catalytic Reduction SCR on Filter).

Furthermore, the heat transferring paths include a Diesel Oxidation Catalyst (DOC) heat exchanger pipe 760 connected to a DOC heat exchanger 560 and intercepted by a DOC heat exchanger valve 565.

The heat transferring paths include an integrated exhaust manifold IEM heat exchanger pipe 770 connected to an IEM heat exchanger 570 and intercepted by an IEM heat exchanger valve 575.

Considering the paths that are closer to the engine 110, it must be noted that the heat management system 940 is connected to a cylinder block heat exchanger 580 by a cylinder block heat exchanger pipe 780 intercepted by a cylinder block heat exchanger valve 585. Furthermore, the cylinder block heat exchanger pipe 780 is connected to the common manifold 800 by means of an electrical pump 610.

Finally, heat management system 940 is connected to a cylinder head heat exchanger 590 by means of a cylinder head heat exchanger pipe 790 intercepted by a cylinder head heat exchanger valve 595.

Each of the pipes 700-790 of the heat management system 940 described above and the common manifold 800 may be heat pipes. In such a way, each heat exchanger is connected to the respective heat source or heat sink by a heat pipe such as the one described in FIG. 4.

In operation, the ECU 450 may control the opening and closing of the various valves intercepting the heat pipes 700-790 to transfer heat where needed. The electric coolant pump 610 may be used in peak-power operations, in such a way that, in normal driving conditions, the power absorbed by the pump 610 is near to zero. An example of the operation of the heat management system 940 above described is herein disclosed under the hypothesis that the various valves are considered normally closed and the opened when necessary under command of the ECU 450.

During warm-up of the engine 110, the valve 505 of the engine oil heat exchanger 500 is opened, as well as the valve 555 of the DPF 285 (or SCR) heat exchanger 550 and the valve 565 of the DOC heat exchanger 560, whereby all actuations of the valves are commanded by the ECU 450. In this way, heat is transferred from the exhaust gas to oil, in order to accelerate warm-up and reduce friction.

Alternatively or subsequently, the ECU 450 commands the opening of valve 515 of the transmission oil heat exchanger 510 and of the valve 585 of the cylinder block heat exchanger 580. This operation avoids engine 110 overheating, transferring heat from engine 110 to oil.

Alternatively or subsequently, the ECU 450 commands the opening of valve 575 of the integrated exhaust manifold heat exchanger 570. In this case, heat is transferred from the IEM to oil.

In case heat storage is needed, the ECU 450 commands the opening of valve 545 of the external heat reservoir 540 and, as a result, heat in excess is conveyed to the heat reservoir 540.

In case of warm engine, the ECU 450 commands the opening of valve 535 of the external heat exchanger 530, such as a radiator, and, as a result, heat in excess is conveyed to the heat exchanger 530 to cool down the engine 110.

In case of transmission oil heating or cooling, the ECU 450 commands the opening of valve 515 of the transmission oil heat exchanger 510.

In case of short route EGR cooling, the ECU 450 commands the opening of valve 525 of the short route (or high pressure) heat exchanger 250.

If a long route (or low pressure) EGR is present (not represented for simplicity), the ECU 450 may command the opening of a dedicated valve for a Long Route heat exchanger.

In normal operations of the engine, the electrical pump 610 is not activated. Only in case of peak power operations, the electrical pump 610 is activated.

Generally speaking, other heat exchangers may be provided in addition or in the alternative to the ones above mentioned which are exemplary embodiments of the proposed thermal management layout. For example another heat exchanger could be placed in the piston surface, or different heat exchangers could be used in the exhaust line, in case of a different aftertreatment layout, and so on.

Figure 5:
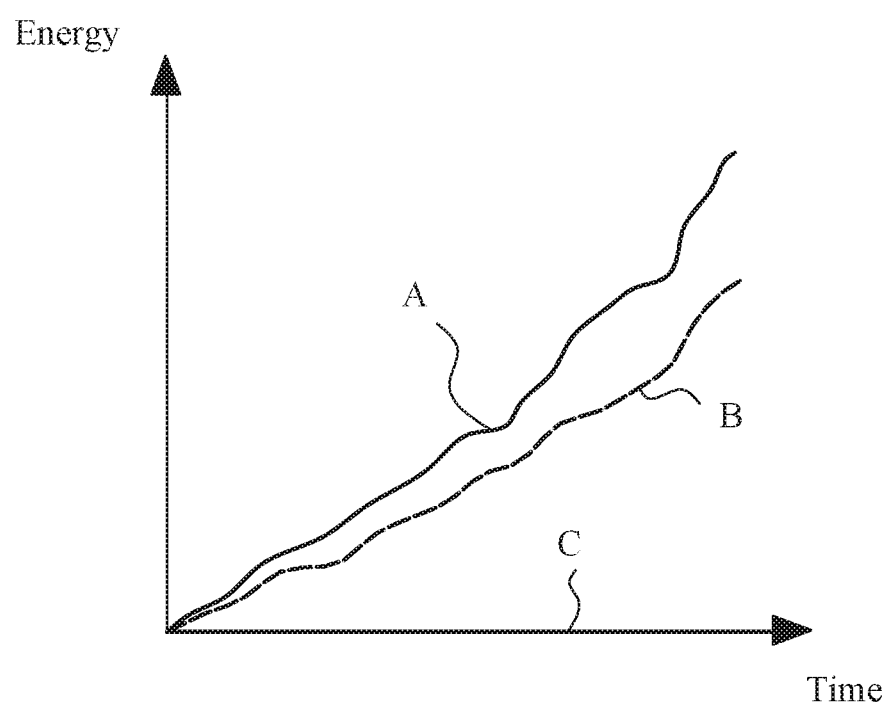
FIG. 5 shows various curves of fuel consumption due to different thermal management systems.

FIG. 5 shows various curves of fuel consumption due to different thermal management systems. The case of a traditional coolant pump is represented in FIG. 5 as curve A. Curve B represents the energy absorption of smart cooling system and curve C, which has zero value, represents the fact that the heat pipe system of the present description does not need a coolant pump during normal operations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A heat management system for an automotive system having a plurality of heat manageable components, the heat management system comprising:
a common manifold;
a plurality of heat exchangers, including a heat exchanger for each of the plurality of heat manageable components of the automotive system;
a plurality of heat pipes, including a respective heat pipe extending between the common manifold and each of the plurality of heat exchangers;
a plurality of valves, including a respective valve positioned along each of the plurality of heat pipes;
wherein each of the plurality of heat pipes is configured to selectively transfer heat from a first heat exchanger of the plurality of heat exchangers to a second heat exchanger of the plurality of heat exchangers based on actuation of the plurality of valves,
wherein each of the plurality of heat pipes is formed by a heat-transfer device comprising a metal casing, a vapor cavity surrounded by the metal casing, and a wick structure in between the metal casing and the vapor cavity, the heat-transfer device having closed first and second ends and containing a working fluid formed by liquid and vapor such that, upon opening of the respective valve, heat at the first end evaporates the working fluid to absorb thermal energy and migrates the vapor along the vapor cavity to the second end whereupon the vapor condenses to release the thermal energy and the liquid is absorbed into the wick structure to flow back to the first end.

2. The heat management system of claim 1, wherein one of the plurality of heat exchangers is an engine oil heat exchanger, one of the plurality of heat pipes is an engine oil heat exchanger pipe connected to the engine oil heat exchanger, and one of the plurality of valves is an engine oil heat exchanger valve positioned along the engine oil heat exchanger pipe.

3. The heat management system of claim 1, wherein one of the plurality of heat exchangers is a transmission oil heat exchanger, one of the plurality of heat pipes is a transmission oil heat exchanger pipe connected to the transmission oil heat exchanger, and one of the plurality of valves is a transmission oil heat exchanger valve positioned along the transmission oil heat exchanger pipe.

4. The heat management system of claim 1, wherein one of the plurality of heat exchangers is an EGR heat exchanger, one of the plurality of heat pipes is an EGR heat exchanger pipe connected to the EGR heat exchanger, and one of the plurality of valves is an EGR heat exchanger valve positioned along the EGR heat exchanger pipe.

5. The heat management system of claim 1, wherein one of the plurality of heat exchangers is an external heat exchanger, one of the plurality of heat pipes is an external heat exchanger pipe connected to the external heat exchanger, and one of the plurality of valves is an external heat exchanger valve positioned along the external heat exchanger pipe.

6. The heat management system of claim 1, wherein one of the plurality of heat exchangers is an external heat reservoir, one of the plurality of heat pipes is an external heat reservoir pipe connected to the external heat reservoir, and one of the plurality of valves is an external heat reservoir valve positioned along the external heat reservoir pipe.

7. The heat management system of claim 1, wherein one of the plurality of heat exchangers is a Diesel Particulate Filter (DPF) heat exchanger, one of the plurality of heat pipes is a DPF heat exchanger pipe connected to the DPF heat exchanger, and one of the plurality of valves is a DPF heat exchanger valve positioned along the DPF heat exchanger pipe.

8. The heat management system of claim 1, wherein one of the plurality of heat exchangers is a Diesel Oxidation Catalyst (DOC) heat exchanger, one of the plurality of heat pipes is DOC heat exchanger pipe connected to the DOC heat exchanger, and one of the plurality of valves is a DOC heat exchanger valve positioned along the DOC heat exchanger pipe.

9. The heat management system of claim 1, wherein one of the plurality of heat exchangers is an integrated exhaust manifold (IEM) heat exchanger, one of the plurality of heat pipes is an IEM heat exchanger pipe connected to the IEM heat exchanger, and one of the plurality of valves is an IEM heat exchanger valve positioned along the IEM heat exchanger pipe.

10. The heat management system of claim 1, wherein one of the plurality of heat exchangers is a cylinder block heat exchanger, one of the plurality of heat pipes is a cylinder block heat exchanger pipe connected to the cylinder block heat exchanger, and one of the plurality of valves is a cylinder block heat exchanger valve positioned along the cylinder block heat exchanger pipe.

11. The heat management system of claim 10, further comprising an electrical pump operably coupled between the common manifold the cylinder block heat exchanger pipe.

12. The heat management system of claim 1, wherein one of the plurality of heat exchangers is a cylinder head heat exchanger, one of the plurality of heat pipes is a cylinder head heat exchanger pipe connected to the cylinder head heat exchanger, and one of the plurality of valves is a cylinder head heat exchanger valve positioned along the cylinder head heat exchanger pipe.

13. An automotive system comprising a heat management system according to claim 1 and further comprising an Electronic Control Unit configured to control the plurality of valves of the heat management system.

14. The heat management system of claim 1, further comprising an Electronic Control Unit (ECU) configured to control the plurality of valves of the heat management system,
wherein one of the plurality of heat exchangers is an engine oil heat exchanger, one of the plurality of heat pipes is an engine oil heat exchanger pipe connected to the engine oil heat exchanger, and one of the plurality of valves is an engine oil heat exchanger valve positioned along the engine oil heat exchanger pipe,
wherein a further one of the plurality of heat exchangers is a Diesel Particulate Filter (DPF) heat exchanger, a further one of the plurality of heat pipes is a DPF heat exchanger pipe connected to the DPF heat exchanger, and a further one of the plurality of valves is a DPF heat exchanger valve positioned along the DPF heat exchanger pipe, and
wherein the ECU is configured to open the engine oil heat exchanger valve and the DPF heat exchanger valve such that heat from the DPF heat exchanger is transferred via the DPF heat exchanger pipe and the engine oil heat exchanger pipe to the engine oil heat exchanger in order to warm the engine oil.

15. The heat management system of claim 1, further comprising an Electronic Control Unit (ECU) configured to control the plurality of valves of the heat management system, wherein one of the plurality of heat exchangers is a Diesel Oxidation Catalyst (DOC) heat exchanger, one of the plurality of heat pipes is DOC heat exchanger pipe connected to the DOC heat exchanger, and one of the plurality of valves is a DOC heat exchanger valve positioned along the DOC heat exchanger pipe, wherein a further one of the plurality of heat exchangers is an engine oil heat exchanger, a further one of the plurality of heat pipes is an engine oil heat exchanger pipe connected to the engine oil heat exchanger, and a further one of the plurality of valves is an engine oil heat exchanger valve positioned along the engine oil heat exchanger pipe, wherein the ECU is configured to open the engine oil heat exchanger valve and the DOC heat exchanger valve such that heat from the DOC heat exchanger is transferred via the DOC heat exchanger pipe and the engine oil heat exchanger pipe to the engine oil heat exchanger in order to warm the engine oil.

16. The heat management system of claim 1, further comprising an Electronic Control Unit (ECU) configured to control the plurality of valves of the heat management system, wherein one of the plurality of heat exchangers is a transmission oil heat exchanger, one of the plurality of heat pipes is a transmission oil heat exchanger pipe connected to the transmission oil heat exchanger, and one of the plurality of valves is a transmission oil heat exchanger valve positioned along the transmission oil heat exchanger pipe, wherein a further one of the plurality of heat exchangers is a cylinder block heat exchanger, a further one of the plurality of heat pipes is a cylinder block heat exchanger pipe connected to the cylinder block heat exchanger, and a further one of the plurality of valves is a cylinder block heat exchanger valve positioned along the cylinder block heat exchanger pipe, wherein the ECU is configured to open the transmission oil heat exchanger valve and the cylinder block heat exchanger valve such that heat from the cylinder block heat exchanger is transferred via the cylinder block heat exchanger pipe and the transmission oil heat exchanger pipe to the transmission oil heat exchanger in order to warm the transmission oil.

17. The heat management system of claim 1, further comprising an Electronic Control Unit (ECU) configured to control the plurality of valves of the heat management system, wherein one of the plurality of heat exchangers is an engine oil heat exchanger, one of the plurality of heat pipes is an engine oil heat exchanger pipe connected to the engine oil heat exchanger, and one of the plurality of valves is an engine oil heat exchanger valve positioned along the engine oil heat exchanger pipe, wherein a further one of the plurality of heat exchangers is an integrated exhaust manifold (IEM) heat exchanger, a further one of the plurality of heat pipes is an IEM heat exchanger pipe connected to the IEM heat exchanger, and a further one of the plurality of valves is an IEM heat exchanger valve positioned along the IEM heat exchanger pipe, wherein the ECU is configured to open the engine oil heat exchanger valve and the IEM heat exchanger valve such that heat from the IEM heat exchanger is transferred via the IEM heat exchanger pipe and the engine oil heat exchanger pipe to the engine oil heat exchanger in order to warm the engine oil.

* * * * *